US007463377B2

(12) United States Patent
Aoki

(10) Patent No.: US 7,463,377 B2
(45) Date of Patent: Dec. 9, 2008

(54) COMMUNICATION APPARATUS PROVIDED WITH ELECTRONIC ADDRESS BOOK

(75) Inventor: Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1170 days.

(21) Appl. No.: 10/254,879

(22) Filed: Sep. 26, 2002

(65) Prior Publication Data

US 2003/0058478 A1  Mar. 27, 2003

(30) Foreign Application Priority Data

Sep. 27, 2001  (JP)  ............................. 2001-295823

(51) Int. Cl.
*G06K 1/00* (2006.01)
*G06F 15/00* (2006.01)
(52) U.S. Cl. ...................... 358/1.15; 358/400; 358/402; 379/100.08
(58) Field of Classification Search ................ 358/1.15, 358/400, 442, 402, 403, 404, 468, 444; 379/100.08, 379/100.09, 100.1, 100.13; 709/238, 201
See application file for complete search history.

(56) References Cited

U.S. PATENT DOCUMENTS

| | | | | | |
|---|---|---|---|---|---|
| 5,289,533 | A | * | 2/1994 | Wasio et al. ........... | 379/100.14 |
| 5,297,196 | A | * | 3/1994 | Yamada et al. ........... | 379/93.07 |
| 5,802,314 | A | * | 9/1998 | Tullis et al. ............... | 709/246 |
| 6,157,945 | A | * | 12/2000 | Balma et al. .............. | 709/206 |
| 6,801,340 | B1 | * | 10/2004 | Endo .......................... | 358/403 |
| 6,853,462 | B1 | * | 2/2005 | Yoshida .................... | 358/1.15 |
| 6,853,482 | B1 | * | 2/2005 | Kitamura et al. ........... | 359/390 |
| 6,885,470 | B1 | * | 4/2005 | Toyoda et al. ............. | 358/1.15 |
| 6,903,838 | B1 | * | 6/2005 | Hanson et al. ............. | 358/1.15 |
| 7,050,188 | B1 | * | 5/2006 | Yajima et al. .............. | 358/1.15 |
| 7,061,653 | B2 | * | 6/2006 | Kohri ........................ | 358/400 |
| 7,324,223 | B1 | * | 1/2008 | Mori ......................... | 358/1.15 |

FOREIGN PATENT DOCUMENTS

JP    A 11-313170    11/1999

* cited by examiner

*Primary Examiner*—Edward L. Coles
*Assistant Examiner*—Negussie Worku
(74) *Attorney, Agent, or Firm*—Oliff & Berridge, PLC

(57) ABSTRACT

A communication apparatus that executes communication in a desired communication mode determined upon the detection of a predetermined operation done by a user to the communication apparatus prior to communication. Recipient information corresponding to the desired communication mode, that is, a telephone, facsimile, or e-mail mode, is retrieved from an electronic address book in which various kinds of recipient information corresponding to the various communication modes are registered and managed together on a recipient-by-recipient basis, in association with names of recipients. A display unit displays thereon a list of names of recipients associated with the retrieved recipient information to allow the user to designate a recipient from the list.

25 Claims, 8 Drawing Sheets

FIG.5

| ID | NAME | PHONETIC NOTATION | TELEPHONE | FACSIMILE | E-MAIL | ADDRESS | |
|---|---|---|---|---|---|---|---|
| 0 | AAA | aaa | 052-xxx-xxxx | 052-yyy-yyyy | aaa@zz.zz | ... | |
| 1 | BBB | bbb | 03-xxxx-xxxx | | | ... | |
| 2 | CCC | ccc | 06-xxxx-xxxx | 06-yyyy-yyyy | | ... | |
| 3 | DDD | ddd | 045-xxx-xxxx | | ddd@zzz.zzz | ... | |
| 4 | EEE | eee | 0568-xx-xxxx | | | ... | |
| 5 | FFF | fff | | | ff@zzz.zzz | | |
| 6 | | | | | | | |

COMMUNICATION APPARATUS PROVIDED WITH ELECTRONIC ADDRESS BOOK

BACKGROUND OF THE INVENTION

1. Field of Invention

The invention relates to a communication apparatus provided with an electronic address book in which voice telephone numbers, facsimile telephone numbers, and e-mail (electronic mail) addresses are registered and managed together, on a recipient-by-recipient basis.

2. Description of Related Art

Recently, facsimile machines and cellular phones are used for many purposes in various communication modes and accomplish e-mail transmission in addition to facsimile transmission and voice telephone calls. Such communication apparatuses are typically provided with an electronic address book in which voice telephone numbers, facsimile telephone numbers, e-mail addresses, and other information about recipients are previously registered. The information about recipients is retrieved with the touch of a key to easily start communication.

An electronic address book has a database structure in which various kinds of data are registered together, regardless of the difference in communication mode, to facilitate registration and reference to the data. A voice telephone number, facsimile telephone number, and e-mail address are registered in each record, in association with the name of each recipient. Additionally, a postal address, date of birth, phonetic notation of the name, and the like can be registered in the record. When the electronic address book is called up prior to communication, all of the names of the recipients are displayed. Upon the designation of a desired name by the user, communication with the designated recipient is promptly started.

A voice telephone number, facsimile telephone number, and e-mail address are all not necessarily required to be registered in a record of the electronic address book, and there may be a record containing blank fields depending on the recipient. For example, in a record about a recipient who has only a voice telephone number, the facsimile telephone number field and the e-mail address field are blank.

The conventional electronic address book displays all the names of the recipients regardless of the presence and absence of the blank fields in the records. For example, when the user calls up the electronic address book to send an e-mail message, the user must find a target recipient from among all the displayed recipients including recipients who have no e-mail address. Therefore, it is time-consuming to operate the electronic address book to designate a recipient who has recipient information corresponding to a desired communication mode.

SUMMARY OF THE INVENTION

The invention addresses the forgoing problems and provides a communication apparatus provided with an electronic address book from which recipients who have recipient information corresponding to a desired communication mode are efficiently retrieved.

According to one exemplary aspect of the invention, a communication apparatus that executes communication with recipients in various communication modes is provided with an electronic address book in which various kinds of recipient information corresponding to the various communication modes are registered and managed together on a recipient-by-recipient basis, in association with recipient identifying information. The communication apparatus further includes a detection unit that detects a predetermined operation done by a user to the communication apparatus prior to communication, and a mode determination unit that determines a desired communication mode used for communication based on the predetermined operation detected by the detection unit, the desired communication mode being one of the various communication modes. The communication apparatus further includes a retrieving unit that checks the electronic address book to see if recipient information corresponding to the desired communication mode is actually registered or null for each recipient and retrieves recipient information actually registered corresponding to the desired communication mode from the various kinds of recipient information registered in the electronic address book, a display unit and a display control unit that controls the display unit to display thereon the recipient information retrieved by the retrieving unit.

BRIEF DESCRIPTION OF THE DRAWINGS

A preferred embodiment of the invention will be described in detail with reference to the following figures, in which like elements are labeled with like numbers in which:

FIG. 5 is a diagram showing an example of the address book database;

DETAILED DESCRIPTION OF PREFERRED EMBODIMENTS

One embodiment of the invention will be described with reference to the accompanying drawings.

Figure 1:
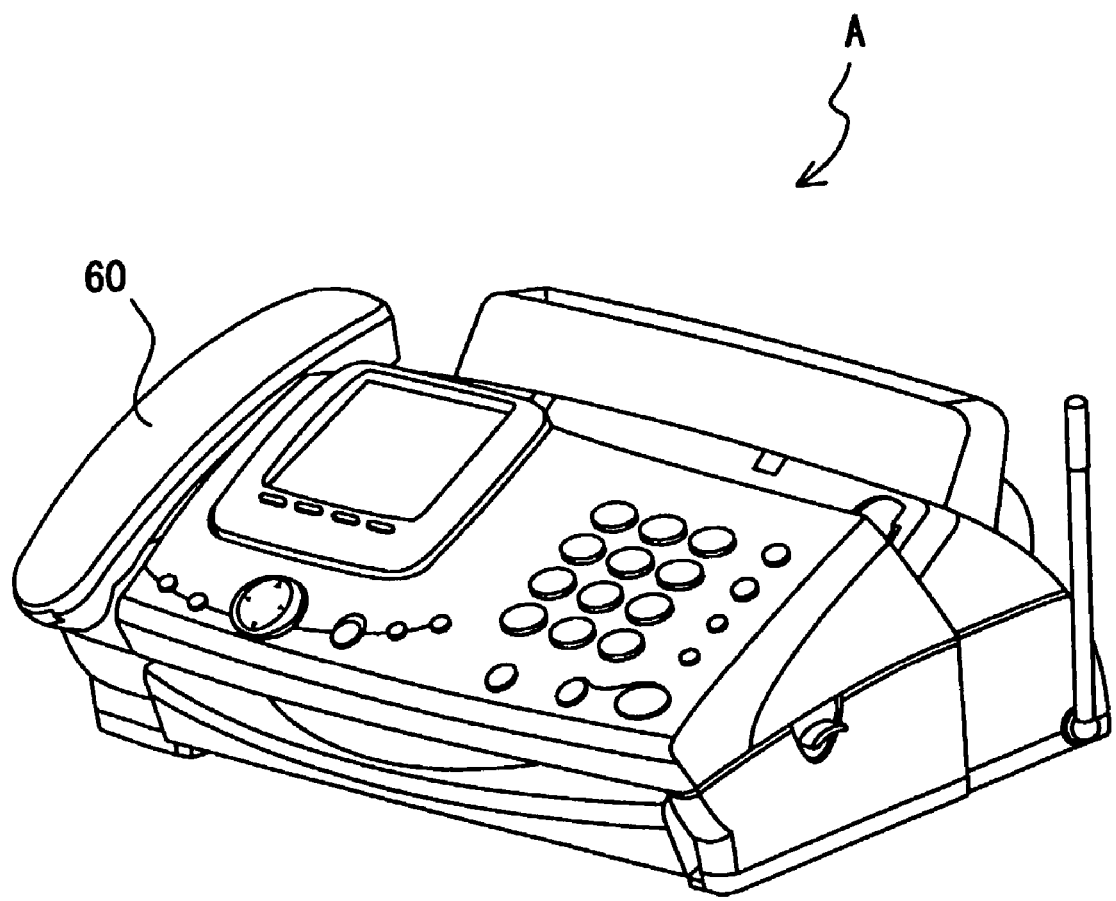
FIG. 1 is a perspective view of a facsimile machine according to the invention.
Figure 2:
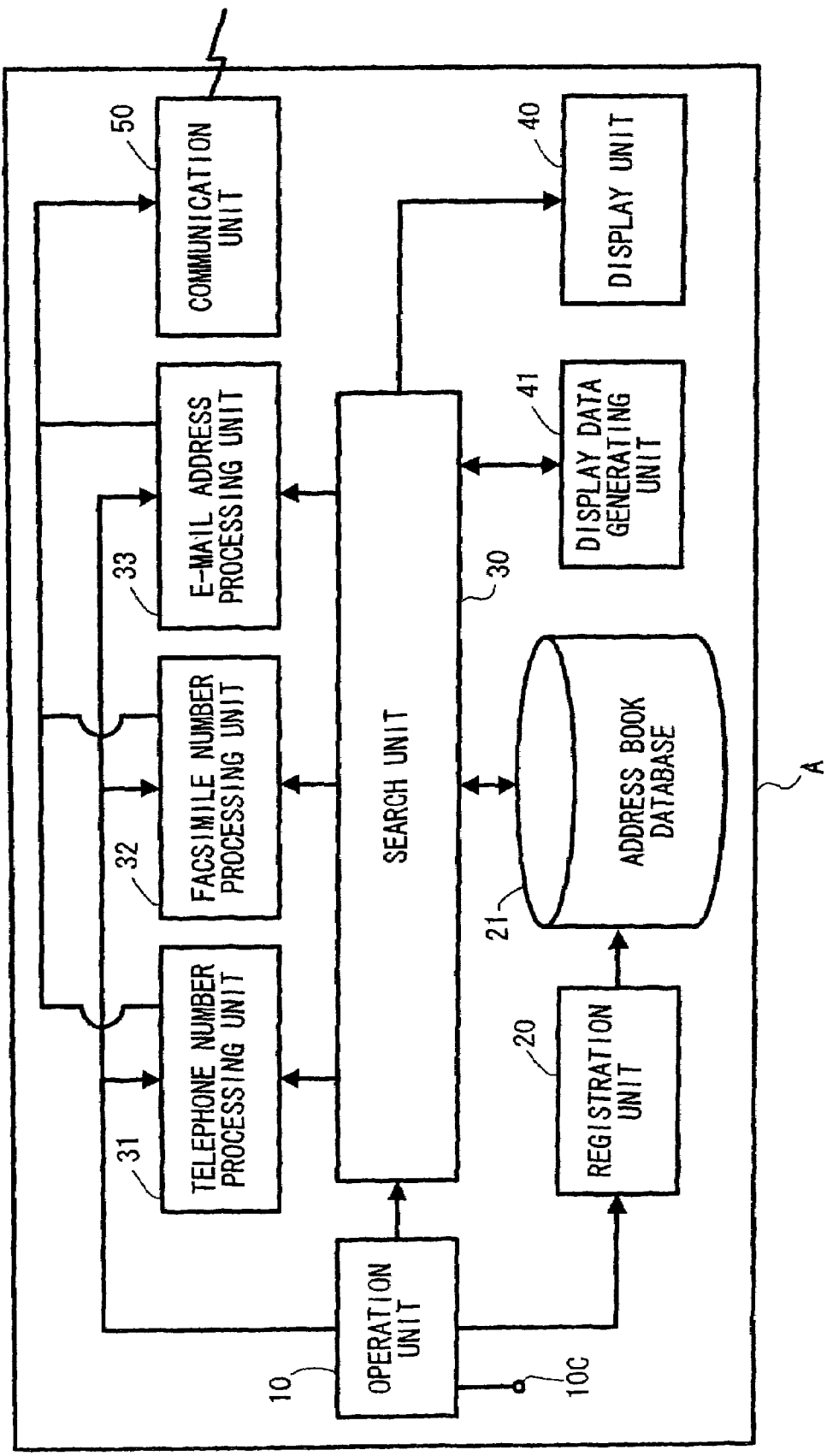
FIG. 2 is a block diagram of the facsimile machine provided with an electronic address book according to the invention.
Figure 3:
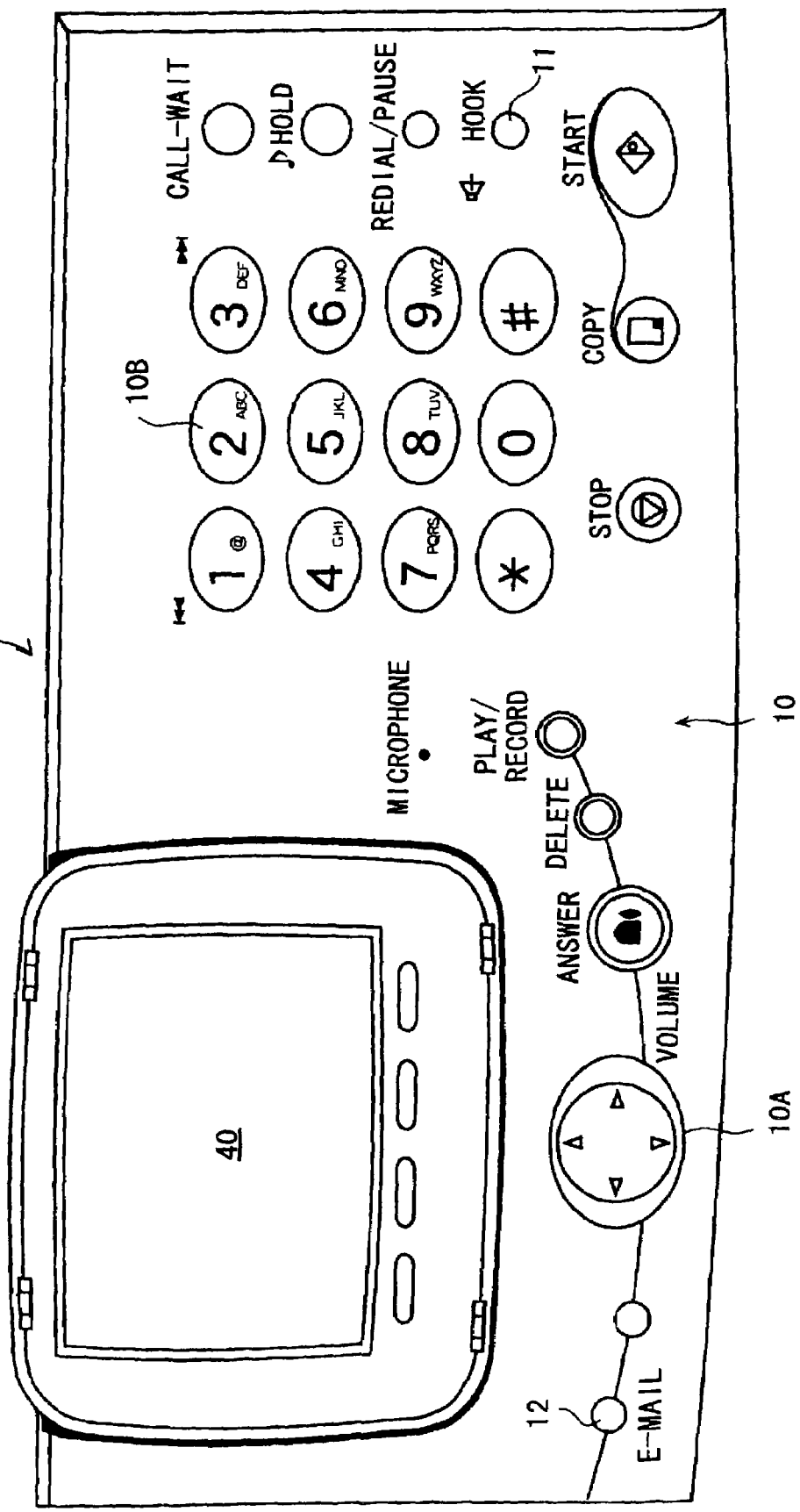
FIG. 3 is a plan view showing the entire front panel of the facsimile machine.

FIG. 1 is a perspective view of a facsimile machine A according to the invention. FIG. 2 is a block diagram of the facsimile machine A provided with an electronic address book according to the invention. FIG. 3 is a plan view of the entire front panel of the facsimile machine A. The facsimile machine A includes a microcomputer as a control center and accomplishes e-mail transmission in addition to facsimile transmission and voice telephone calls. The facsimile machine A, if broken down into hardware/software functions, includes an operation unit 10, a registration unit 20, an address book database 21, a search unit 30, a telephone number processing unit 31, a facsimile number processing unit 32, an email address processing unit 33, a display unit 40, a display data generating unit 41, and a communication unit 50.

Figure 4:
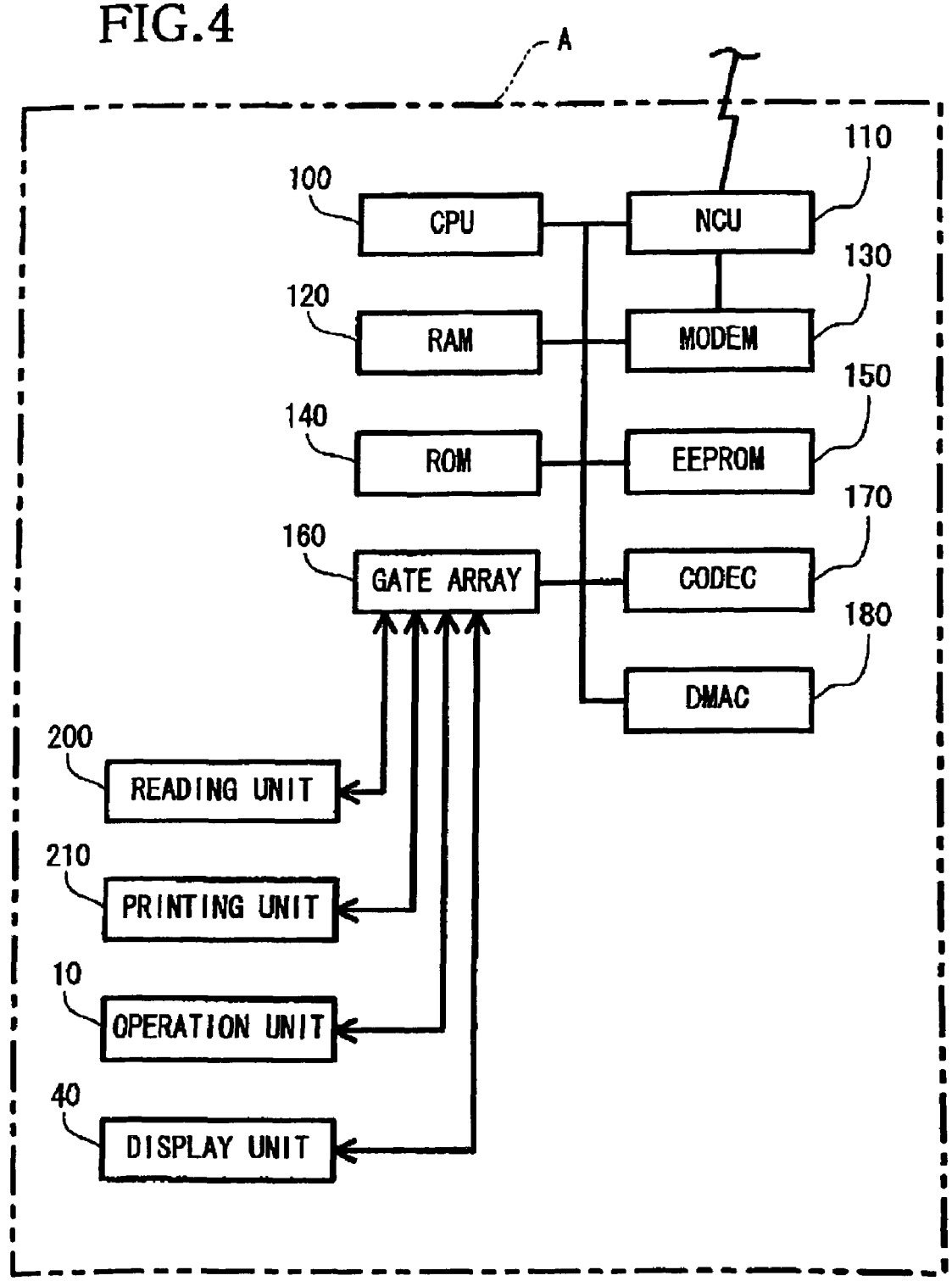
FIG. 4 is a block diagram showing the structure of the facsimile machine.

FIG. 4 is a block diagram showing the structure of the facsimile machine A. A CPU 100 of the facsimile machine A controls the entire operation of the facsimile machine A. A NCU (network control unit) 110 is connected to a public telephone line and performs network control. When a handset 60 is lifted, the NCU 50 is automatically connected to the public telephone line. A RAM 120 provides a workspace for the CPU 100 and a storage space where various data is stored. A modem 130 modulates and demodulates facsimile data. A ROM 140 stores therein programs to be executed by the CPU 100 and data. An EEPROM (electrically erasable programmable ROM) 150 stores therein various flags and setting data. A gate array 160 functions as an interface between the CPU 100 and each unit. A codec 170 encodes and decodes facsimile data. A DMAC 180 writes and reads data to and from the RAM 120. A reading unit 200 is provided with an image sensor and a LED (light-emitting diode) and reads an image from a document. A printing unit 210 performs electrophotographic printing or ink-jet printing. The operation unit 10 is provided with key switches, such as a numeric keypad 10B, and transmits commands according to key operations by the user. The display unit 40 is provided with a display, such as a LCD (liquid crystal display), and displays various information.

Referring to FIG. 2, the function of the CPU 100 of the facsimile machine A will be described. The operation unit 10 transmits commands, according to operations thereof by the user, to the registration unit 20, search unit 30, telephone number processing unit 31, facsimile number processing unit 32, and e-mail address processing unit 33. The operation unit 10 includes a cursor key 10A and the numeric keypad 10B shown in FIG. 3 as well as a document sensor 10C that automatically detects insertion of a document. The registration unit 20 newly registers and modifies various kinds of data in the address book database 21. The cursor key 10A is used to display the electronic address book on the display unit 40 and to select a recipient from among the recipients displayed thereon.

The address book database 21 is an electronic address book designed to save the user from having to enter a telephone number or the like. FIG. 5 is a diagram showing an example of the address book database 21. As shown in FIG. 5, the address book database 21 is a relational database containing sets of records arranged based on the ID numbers associated with recipients who receive voice telephone calls, facsimile transmission, and email messages. Each record contains data fields for a name of a recipient, phonetic notation of the name, telephone number for a voice telephone call (hereinafter simply referred to as "telephone number"), telephone number for facsimile transmission (hereinafter simply referred to as "facsimile number"), e-mail address, postal address, and the like. Fields other than the ID number may be blank. For example, a telephone number, facsimile number, and e-mail address are all registered in the record containing the name "AAA". In contrast, only a telephone number is registered in the record containing the name "BBB" or "EEE", and the facsimile number field and the e-mail address field are blank without any entries. In other words, information about the facsimile number and the e-mail address is null for the record containing the name "BBB" or "EEE". The address book database 21 structured as described above is used when the user selects a recipient to start communication.

The search unit 30 searches the address book database 21 according to commands from the operation unit 10 and transmits the search result to the display data generating unit 41. In addition, the search unit 30 returns the telephone number, facsimile number, and e-mail address of a recipient designated by the user to the telephone number processing unit 31, facsimile number processing unit 32, and e-mail address processing unit 33, respectively. The search unit 30 serves as a user interface when searching the address book. For example, when the user lifts the handset 60 or presses a hook button 11 on the operation unit 10 to gain access to a telephone line, the search unit 30 starts searching the address book database 21 for recipients whose telephone numbers have been registered, and transmits the data on the names of applicable recipients to the display data generating unit 41. When the user inserts a document into a predetermined portion of the facsimile machine A prior to facsimile transmission, the search unit 30 starts searching the address book database 21 for recipients whose facsimile numbers have been registered, and transmits the data on the names of applicable recipients to the display data generating unit 41. Further, when, in order to transmit an e-mail message, the user presses an E-mail key 12 on the operation unit 12 and creates a message using the numeric keypad 10B and presses a predetermined key, for example, a confirm key (not shown) to complete the creation of the message, the search unit 30 starts searching the address book database 21 for recipients whose e-mail addresses have been registered, and transmits the data on the names of applicable recipients to the display data generating unit 41.

Subsequently, the telephone number processing unit 31 receives the telephone number designated by the user from the search unit 30 and notifies the communication unit 50 of that telephone number. The facsimile number processing unit 32 receives the facsimile number designated by the user from the search unit 30 and notifies the communication unit 50 of that facsimile number. The e-mail address processing unit 33 receives the e-mail address designated by the user from the search unit 30 and instructs the communication unit 50 to transmit the e-mail message to the that e-mail address.

Even when the electronic address book is searched and the names of applicable recipients are displayed as described above, a telephone number, facsimile number, or e-mail address can be entered by the user using the numeric keypad 10B. The entered telephone number, facsimile number, or e-mail address are given priority over those displayed, and are received by the telephone number processing unit 31, the facsimile number processing unit 32, or the e-mail address processing unit 33.

The display unit 40, which is, for example, a LCD, displays thereon various kinds of information while being controlled by the display data generating unit 41. The display data generating unit 41 controls the display unit 40 to display thereon the data transmitted from the search unit 30 to the data generating unit 41. Thus, the display unit 40 displays thereon, by a list, only the names of the recipients whose telephone numbers have been registered, only the names of the recipients whose facsimile numbers have been registered, or only the names of the recipients whose e-mail addresses have been registered. The communication unit 50 connects to a telephone line based on the telephone number, facsimile number, and e-mail address received from the telephone number processing unit 31, facsimile number processing unit 32, and e-mail address processing unit 33, respectively. When the communication unit 50 connects to a telephone line based on the e-mail address, the communication unit 50 does not send the e-mail address directly to the telephone line, but connects to a telephone line using a telephone number previously set by an internet service provider to gain access to an external mail server.

Referring now to FIGS. 6-9, the operation of the CPU 100 of the facsimile machine A will be described.

Figure 6:
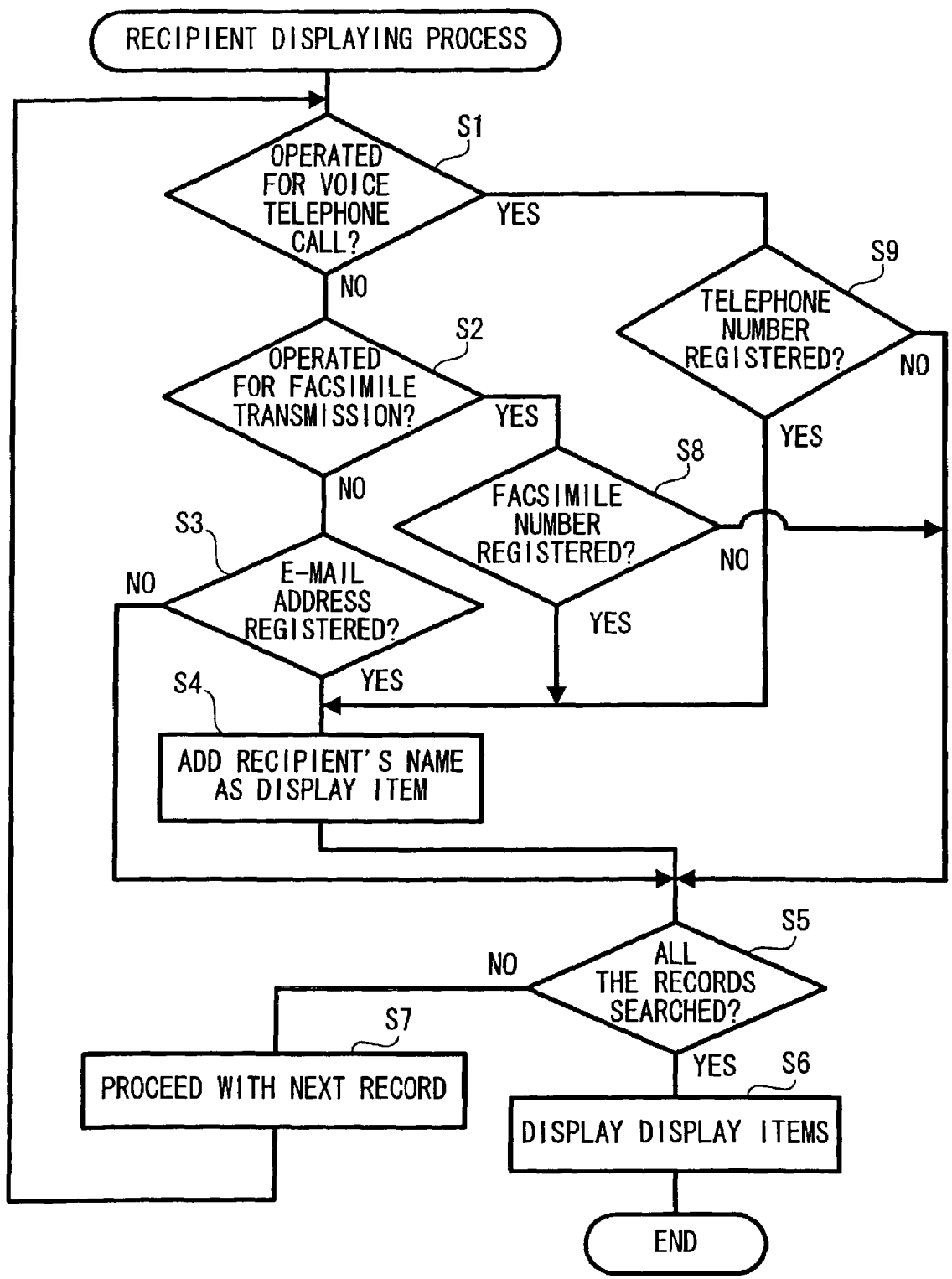
FIG. 6 is a flowchart of the recipient displaying process using the electronic address book.
Figure 7:
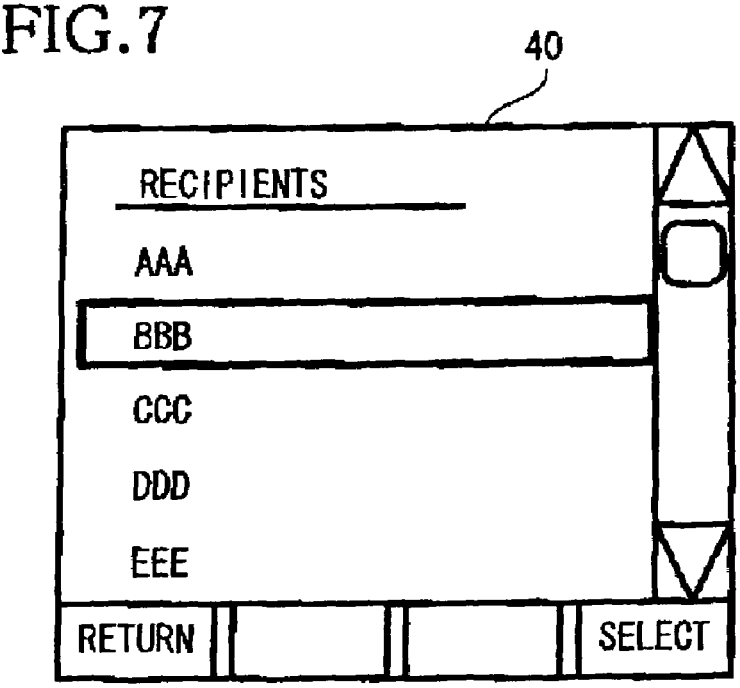
FIG. 7 shows a screen of a display unit where names of recipients are displayed.
Figure 8:
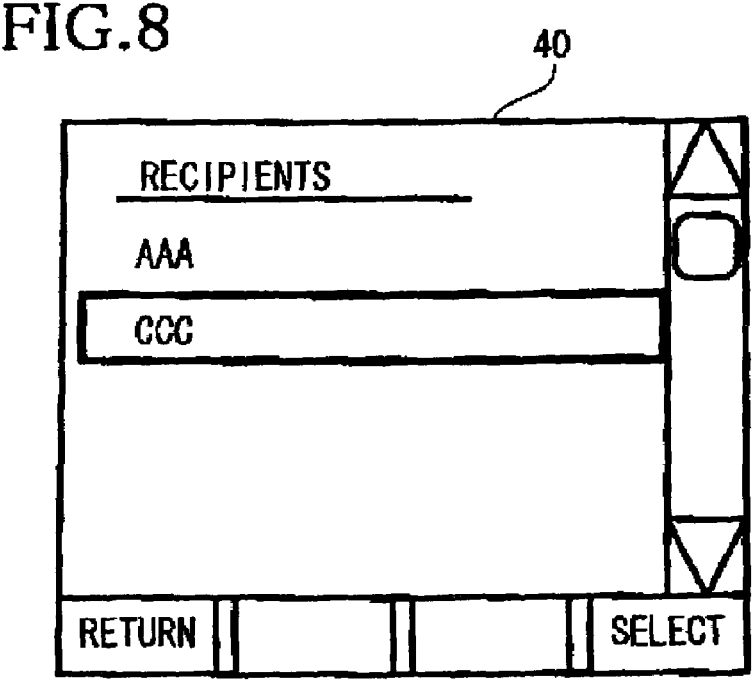
FIG. 8 shows a screen of the display unit where names of recipients are displayed.
Figure 9:
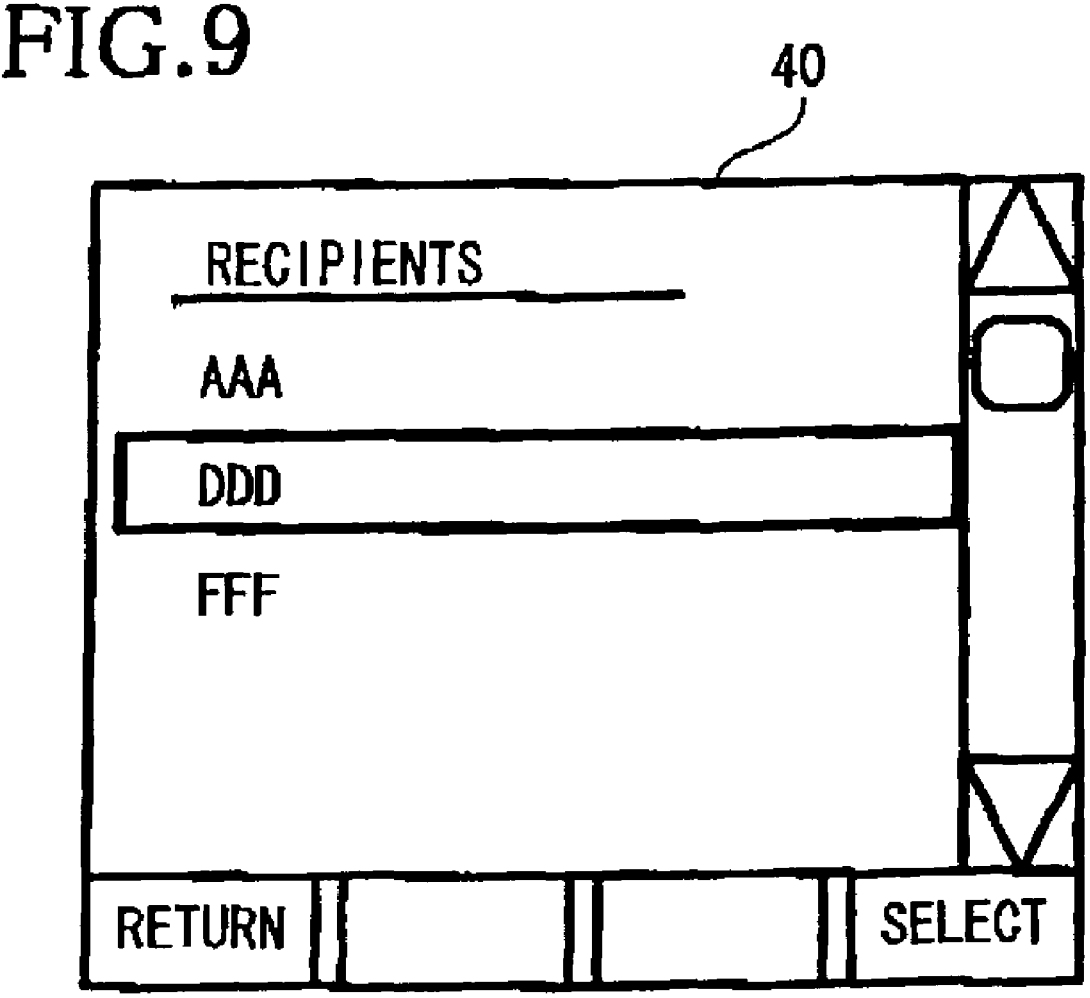
FIG. 9 shows a screen of the display unit where names of recipients are displayed.

FIG. 6 is a flowchart of the recipient displaying process executed by the CPU 100 using the electronic address book. FIGS. 7-9 show screens of the display unit 40 where names of recipients are displayed.

As shown in FIG. 6, when the CPU 100 judges that the user does not operate the facsimile machine A in a stand-by mode to proceed with a voice telephone call (S1: NO) or to proceed with facsimile transmission (S2: NO), but the CPU 100 judges that the user proceeds with e-mail transmission based on the pressing of a predetermined key, for example, a confirm key (not shown) on the operation unit 10 by the user to complete the creation of an e-mail message, the e-mail address fields are automatically called up to be searched, and the e-mail address field of each record is checked to determine if an e-mail address has been registered there (S3).

When an e-mail address has been registered in the record in question (S3: YES), a recipient's name registered in that record is added as a display item (S4).

Upon the completion of searching all the records (S5: YES), display items are displayed (S6) and the recipient displaying process is completed. At this time, as shown in FIG. 9, only the names of the recipients whose e-mail addresses are stored in the address book database 21 ("AAA", "DDD", and "FFF") are listed on the display unit 40. Then, when the user operates the cursor key 10A to designate, for example, the name "DDD" from among the names in the list, the e-mail message is sent to the recipient "DDD".

In S5, when all the records have not yet been searched (S5: NO), the next record becomes subject to searching (S7), and the process returns to S1, again.

In S3, when no e-mail address has been registered in the record in question, that is, when the e-mail address filed for the record in question is blank (S3: NO), a recepient's mane registered in that record is not added as a display item, and the process goes to S5.

In S2, when the CPU 100 judges that the user proceeds with facsimile transmission based on a detection by the document sensor 10C of an insertion of a document by the user (S2: YES), the facsimile number fields in the address book database 21 are automatically called up to be searched, and the facsimile number field of each record is checked to determine if a facsimile number has been registered there (S8).

When a facsimile number has been registered in the record in question (S8:YES), the process goes to S4, where a recipient's name registered in that record is added as a display item. At this time, as shown in FIG. 8, only the names of the recipients who have a fascimile number ("AAA" and "CCC") are listed on the display unit 40. Then, when the user operates the cursoror key 10A to designate, for example, the name "CCC" from among the names in the list, the facsimile data read from the inserted document is sent to the recipient "CCC". IN S8, when no facsimile number has been registered in the record in question, that is, when the facsimile number filed for the record in question is blank (S8: NO), a recipient's name registered in that record is not added as a display item, and the process goes to S5.

In S1, when the CPU 100 judges that the user proceeds with a telephone call based on the lifting of the handset 60 or pressing of the hook button 11 by the user (S1: YES), the telephone number fields in the address book database 21 are automatically called up to be searched, and the telephone number field of each record is checked to determine if a telephone number has been registered there (S9).

When a telephone number has been registered in the record in question (S9:YES), the process goes to S4, where a recipient's name registered in that record is added as a display item. At this time, as shown in FIG. 7, only the names of the recipients who have a telephone number ("AAA", "BBB", "CCC", "DDD", and "EEE") are listed on the display unit 40. Then, when the user operates the cursor key 10A to designate, for example, the name "BBB"from among the names in the list, a telephone call to the recipient "BBB" is made. In S9, when no telephone number has been registered in the record in question, that is,when the telephone number field for the record in question is blank (S9:NO), a recipient's name registered in that record is not added as a display item, and the process goes to S5.

The above-described recipient displaying process is executed by the CPU 100 of the facsimile machine A. This process can also be executed using a computer program, which accomplishes the same operation and function as the CPU 10 when stored in the ROM 14 of the facsimile machine A.

In the above-described facsimile machine A, when the user starts communication with a recipient in accordance with a desired communication mode, that is, a telephone mode, a facsimile mode, or an e-mail mode, only the names of the recipients who have, in the address book database 21, recipient information corresponding to the desired communication mode are searched and displayed. The names of the recipients who have, in the address book database 21, only recipient information irrelevant to the desired communication mode are not displayed. Thus, the recipients having the recipient information corresponding to the desired communication mode are efficiently retrieved.

Further, in the above-described communication apparatus, the recipient information corresponding to the desired communication mode is retrieved by checking the electronic address book to see if the recipient information corresponding to the desired communication mode is actually registered or null for each recipient, and only the recipient information actually registered corresponding to the desired communication mode is retrieved in association with the recipient names to be displayed. Thus, even when the electronic address book contains blank telephone number fields, blank facsimile number fields, and/or blank e-mail address fields, such blank fields are excluded and the recipient information corresponding to the desired communication mode is efficiently retrieved.

In addition, the desired communication mode is determined by the CPU 100 upon the detection of a predetermined operation done by the user to the facsimile machine A, and searching and displaying the names of the recipients having recipient information corresponding to the desired communication mode are automatically started. Thus, the user can start communication in the desired communication mode easily and quickly without setting the communication mode to a desired one.

Further, when the recipient information corresponding to the desired communication mode is retrieved, only the names of the recipients associated with the retrieved recipient information are displayed on the display unit 40. Thus, even when the display unit 40 has a limited space for displaying, the necessary information for the user to designate a desired recipient can be displayed thereon.

Further, when the user designates a desired recipient from among the displayed recipients, communication with the designated recipient is started. Thus, the user can start communication with the desired recipient in the desired communication mode easily and quickly.

The invention is not limited to the above-described embodiment and various modifications may be made without departing from the spirit and scope of the invention.

Whereas, in the above-described embodiment, the facsimile machine A has three communication modes, that is, telephone, facsimile, and e-mail modes, the facsimile machine A may have only two modes, that is, telephone and e-mail modes or telephone and When a list of names of all of the recipients cannot be displayed at the same time on the lay unit 40, the list may be scrolled using the cursor key 10A.

In addition to the names of the recipients, telephone numbers, facsimile numbers, or e-mail addresses associated with the recipients may be displayed.

When the common facsimile data is transmitted by facsimile to certain recipients and by e-mail as an attached file to certain recipients, a list of names of recipients who have a facimile number and/or an e-mail address may be displayed and the communication mode may be designated for each recipient.

Further, in the above-described embodiment, information stored in the electronic address book 21 is displayed on the display unit 40 automatically based on the judgment desired communication mode by the CPU 100 in S1, S2, and S3. Instead, information stored in the electronic address book 21 may be displayed when the user operates a predetermined key, for example, the cursor key 10A after the CPU 100 designates the desired communication mode.

Alternatively, all the names of recipients may be displayed on the display unit 40 upon the operation of a predetermined key, for example, the cursor key 10A, and then then names of applicable recipients may be displayed based on the judgment of the desired communication mode by the CPU 100 in S1, S2, and S3.

It should be understood that the invention is not limited in its application to the details of structure and arrangement of parts illustrated in the accompanying drawings. The invention is capable of other embodiments and of being practiced or performed in various ways without departing from the technical idea thereof, based on existing and well-known techniques among those skilled in the art.

What is claimed is:

1. A communication apparatus that executes communication with recipients in a plurality of communication modes, the communication apparatus comprising:
    an electronic address book in which a plurality of pieces of recipient information that correspond to the plurality of communication modes are registerable for each of the recipients, in association with a recipient identifier that identifies each of the recipients;
    a detection unit that detects a predetermined operation done by a user prior to communication;
    a mode determination unit that determines a desired communication mode used for communication based on the predetermined operation detected by the detection unit, the desired communication mode being one of the plurality of communication modes;
    a retrieving unit that:
        checks the electronic address book and determines whether one of the plurality of pieces of recipient information that corresponds to the desired communication mode is registered or null for each of the recipients and
        retrieves from the electronic address book recipients that each have the registered piece of recipient information that corresponds to the desired communication mode;
    a display unit; and
    a display control unit that controls the display unit to display thereon, for each of the retrieved recipients, at least one of the registered piece of recipient information and the recipient identifier associated with the registered piece of recipient information.

2. The communication apparatus according to claim 1, wherein the display control unit controls the display unit to display thereon, for the retrieved recipients, a list of the recipient identifiers associated with the registered pieces of recipient information that correspond to the desired communication mode.

3. The communication apparatus according to claim 1, wherein the retrieving unit retrieves from the electronic address book the recipients that each have the registered piece of recipient information that corresponds to the desired communication mode automatically upon determination by the mode determination unit of the desired communication mode, and the display control unit controls the display unit automatically upon retrieval by the retrieving unit of the recipients that each have the registered piece of recipient information.

4. The communication apparatus according to claim 1, wherein when the at least one of the registered piece of recipient information and the recipient identifier that corresponds to a desired one of the retrieved recipients is designated on the display unit, the communication apparatus executes communication with the desired one of the retrieved recipients in the desired communication mode.

5. The communication apparatus according to claim 1, wherein the plurality of communication modes are at least two communication modes selected from a telephone mode, a facsimile mode, and an e-mail mode.

6. The communication apparatus according to claim 5, further comprising at least one of a handset and a hook button, wherein when the detection unit detects a lifting of the handset or a pressing of the hook button by the user, the mode determination unit determines that the telephone mode is used for communication.

7. The communication apparatus according to claim 5, wherein when the detection unit detects an insertion of a document by the user into a predetermined portion of the communication apparatus, the mode determination unit determines that the facsimile mode is used for communication.

8. The communication apparatus according to claim 5, wherein when the detection unit detects a completion of a creation of an e-mail message by the user, the mode determination unit determines that the e-mail mode is used for communication.

9. The communication apparatus according to claim 5, wherein the plurality of pieces of recipient information registered for each of the recipients in the electronic address book are at least two pieces of information selected from telephone number, a facsimile number, and an e-mail address.

10. The communication apparatus according to claim 1, further comprising a registration unit that newly registers and modifies for each of the recipients the plurality of pieces of recipient information that corresponds to the plurality of communication modes in the electronic address book.

11. The communication apparatus according to claim 1, wherein the recipient identifier is recipient name.

12. A computer executable program stored in a storage media, used in a communication apparatus, including a display unit and an electronic address book, to execute communication with recipients in a plurality of communication modes, the program comprising:
    a program for detecting a predetermined operation done by a user prior to communication;
    a program for determining a desired communication mode used for communication based on the detected predetermined operation, the desired communication mode being one of the plurality of communication modes;
    a program for checking the electronic address book in which a plurality of pieces of recipient information that correspond to the plurality of communication modes are registered for each of the recipients, in association with a recipient identifier that identifies each of the recipients, to determine whether one of the plurality of pieces of recipient information that corresponds to the desired communication mode is registered or null for each of the recipients;

a program for retrieving from the electronic address book recipients that each have the registered piece of recipient information that corresponds to the desired communication mode; and a program for controlling the display unit to display thereon, for each of the retrieved recipients, at least one of the registered piece of recipient information and the recipient identifier associated with the registered piece of recipient information.

13. The computer executable program stored in a storage media according to claim 12, wherein the display unit is controlled to display thereon, for the received recipients, a list of the recipient identifiers associated with the registered pieces of retrieved recipient information that correspond to the desired communication mode.

14. The computer executable program stored in a storage media according to claim 12, further comprising a program for executing communication with the desired one of the retrieved recipients in the desired communication mode when the at least one of the registered piece of recipient information and the recipient identifier that corresponds to a desired one of the retrieved recipients is designated on the display unit.

15. The computer executable program stored in a storage media according to claim 12, wherein the electronic address book is checked automatically upon determination of the desired communication mode, and the display unit is controlled automatically upon retrieval of the recipients that each have the registered piece of recipient information.

16. The computer executable program stored in a storage media according to claim 12, wherein when the detected predetermined operation done by the user is a lifting of a handset or a pressing of a hook button, the desired communication mode determined is a telephone mode.

17. The computer executable program stored in a storage media according to claim 12, wherein when the detected predetermined operation done by the user is an insertion of a document into a predetermined portion of the communication apparatus, the desired communication mode determined is a facsimile mode.

18. The computer executable program stored in a storage media according to claim 12, wherein when the detected predetermined operation done by the user is a completion of a creation of an e-mail message, the desired communication mode determined is an e-mail mode.

19. A method of controlling a communication apparatus, including a display unit and an electronic address book, to execute communication with recipients in a plurality of communication modes, comprising:

detecting a predetermined operation done by a user prior to communication;

determining a desired communication mode used for communication based on the detected predetermined operation, the desired communication mode being one of the plurality of communication modes;

checking the electronic address book, in which a plurality of pieces of recipient information that corresponds to the plurality of communication modes are registerable for each of the recipients, in association with a recipient identifier that identifies each of the recipients, to determine whether one of the plurality of pieces of recipient information that corresponds to the desired communication mode is registered or null for each of the recipients;

retrieving from the electronic address book recipients that each have the registered piece of recipient information that corresponds to the desired communication mode; and controlling the display unit to display thereon, for each of the retrieved recipients, at least one of the registered piece of recipient information and the recipient identifier associated with the registered piece of recipient information.

20. The method of claim 19, wherein the display unit is controlled to display thereon, for the received recipients, a list of the recipient identifiers associated with the registered pieces of retrieved recipient information that correspond to the desired communication mode.

21. The method of claim 19, further comprising executing communication with the desired one of the retrieved recipients in the desired communication mode when the at least one of the registered piece of recipient information and the recipient identifier that corresponds to a desired one of the retrieved recipients is designated on the display unit.

22. The method of claim 19, wherein the electronic address book is checked automatically upon determination of the desired communication mode, and the display unit is controlled automatically upon retrieval of the recipients that each have the registered piece of recipient information.

23. The method of claim 19, wherein when the detected predetermined operation done by the user is a lifting of a handset or a pressing of a hook button, the desired communication mode determined is a telephone mode.

24. The method of claim 19, wherein when the detected predetermined operation done by the user is an insertion of a document into a predetermined portion of the communication apparatus, the desired communication mode determined is a facsimile mode.

25. The method of claim 19, wherein when the detected predetermined operation done by the user is a completion of a creation of an e-mail message, the desired communication mode determined is an e-mail mode.

* * * * *